United States Patent
Hines

(10) Patent No.: US 7,363,203 B2
(45) Date of Patent: Apr. 22, 2008

(54) DETERMINING EVENT CAUSALITY INCLUDING EMPLOYMENT OF PARTITIONED EVENT SPACE

(75) Inventor: Ken Hines, Kenmore, WA (US)

(73) Assignee: GraniteEdge Networks, Bellevue, WA (US)

( * ) Notice: Subject to any disclaimer, the term of this patent is extended or adjusted under 35 U.S.C. 154(b) by 244 days.

(21) Appl. No.: 11/168,258

(22) Filed: Jun. 27, 2005

(65) Prior Publication Data

US 2005/0288916 A1    Dec. 29, 2005

Related U.S. Application Data

(60) Provisional application No. 60/583,455, filed on Jun. 28, 2004.

(51) Int. Cl.
*G06F 17/50* (2006.01)
*H04L 29/00* (2006.01)
*G06F 11/30* (2006.01)

(52) U.S. Cl. .................. 703/2; 703/17; 702/183; 717/128; 709/224

(58) Field of Classification Search ............. 703/2, 703/17, 22; 714/25; 717/125, 128; 702/183; 709/224
See application file for complete search history.

(56) References Cited

U.S. PATENT DOCUMENTS

| | | | | |
|---|---|---|---|---|
| 5,493,729 A | * | 2/1996 | Nigawara et al. | 706/52 |
| 6,324,495 B1 | * | 11/2001 | Steinman | 703/17 |
| 7,143,392 B2 | * | 11/2006 | li et al. | 717/125 |
| 2002/0062463 A1 | | 5/2002 | Hines | |
| 2002/0174415 A1 | | 11/2002 | Hines | |
| 2003/0018928 A1 | * | 1/2003 | James et al. | 714/25 |
| 2003/0028858 A1 | | 2/2003 | Hines | |
| 2003/0056200 A1 | * | 3/2003 | Li et al. | 717/128 |
| 2003/0121027 A1 | | 6/2003 | Hines | |
| 2005/0235264 A1 | | 10/2005 | Hines | |
| 2005/0288915 A1 | * | 12/2005 | Hines | 703/17 |
| 2006/0036426 A1 | * | 2/2006 | Barr et al. | 703/22 |

* cited by examiner

*Primary Examiner*—Thai Phan
(74) *Attorney, Agent, or Firm*—Schwabe, Williamson & Wyatt, P.C.

(57) ABSTRACT

Causal relationships between events in a plurality of inter-related causal chains are maintained in a network event space through the partitioning of the event space into event subspaces. In this manner, events sharing the same event subspace stay constant so long as the partitioned subspace is substantially causally consistent. The causality of events from different neighboring subspaces may be determined through the individual subspace determination on each query event until a joining of shared boundary events is possible.

30 Claims, 12 Drawing Sheets

DETERMINING EVENT CAUSALITY INCLUDING EMPLOYMENT OF PARTITIONED EVENT SPACE

RELATED APPLICATION

This application claims the benefit of priority from Provisional Application Ser. No. 60/583,455, filed Jun. 28, 2004, which specification is fully incorporated herein by reference.

TECHNICAL FIELD

Embodiments of the present invention relate to the fields of data processing and data communication. More specifically, embodiments of the present invention are related to methods and apparatus for determining (or allowing the determining) of event causality in a networking environment, and/or the usage (or allowing the usage) of the determination.

BACKGROUND

Many problems require the understanding and/or determining the causality between events. An exemplary technical problem that requires such understanding and/or determination is the management of modern networks. Advances in semiconductor, processor, and related technologies have led to the ubiquitous availability of a wide range of general and special purpose computing devices. Additionally, advances in telecommunication, networking, and related technologies have led to increased connectivity between these computing devices. Understanding the causality of events may lead to more efficient and effective management of these increasingly diverse networks.

BRIEF DECRIPTION OF THE DRAWINGS

The present invention will be described by way of exemplary embodiment but not limitations, illustrated in the accompanying drawings in which like references denote similar elements, and in which.

Figure 3:
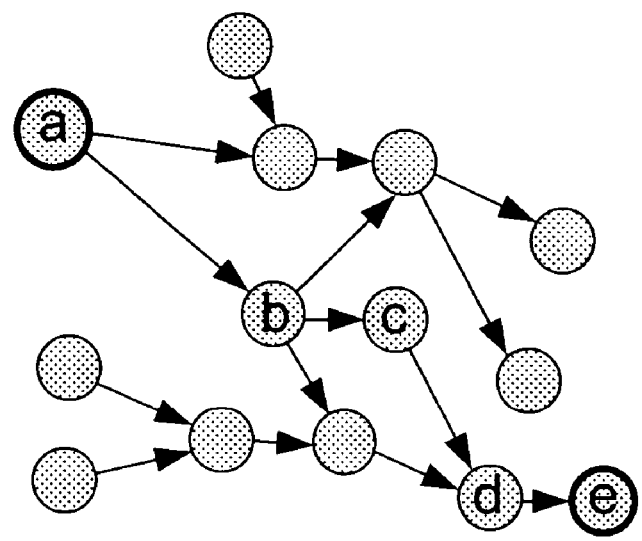
FIG. 3 illustrates a graphical representation of causally related events, in accordance with various embodiments of the present invention.
Figure 4:
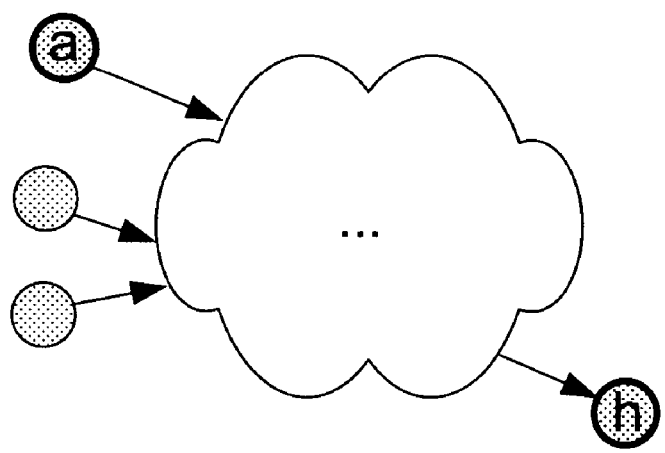
FIG. 4 illustrates a graphical representation of potentially causally related events, in accordance with various embodiments of the present invention.
Figure 5:
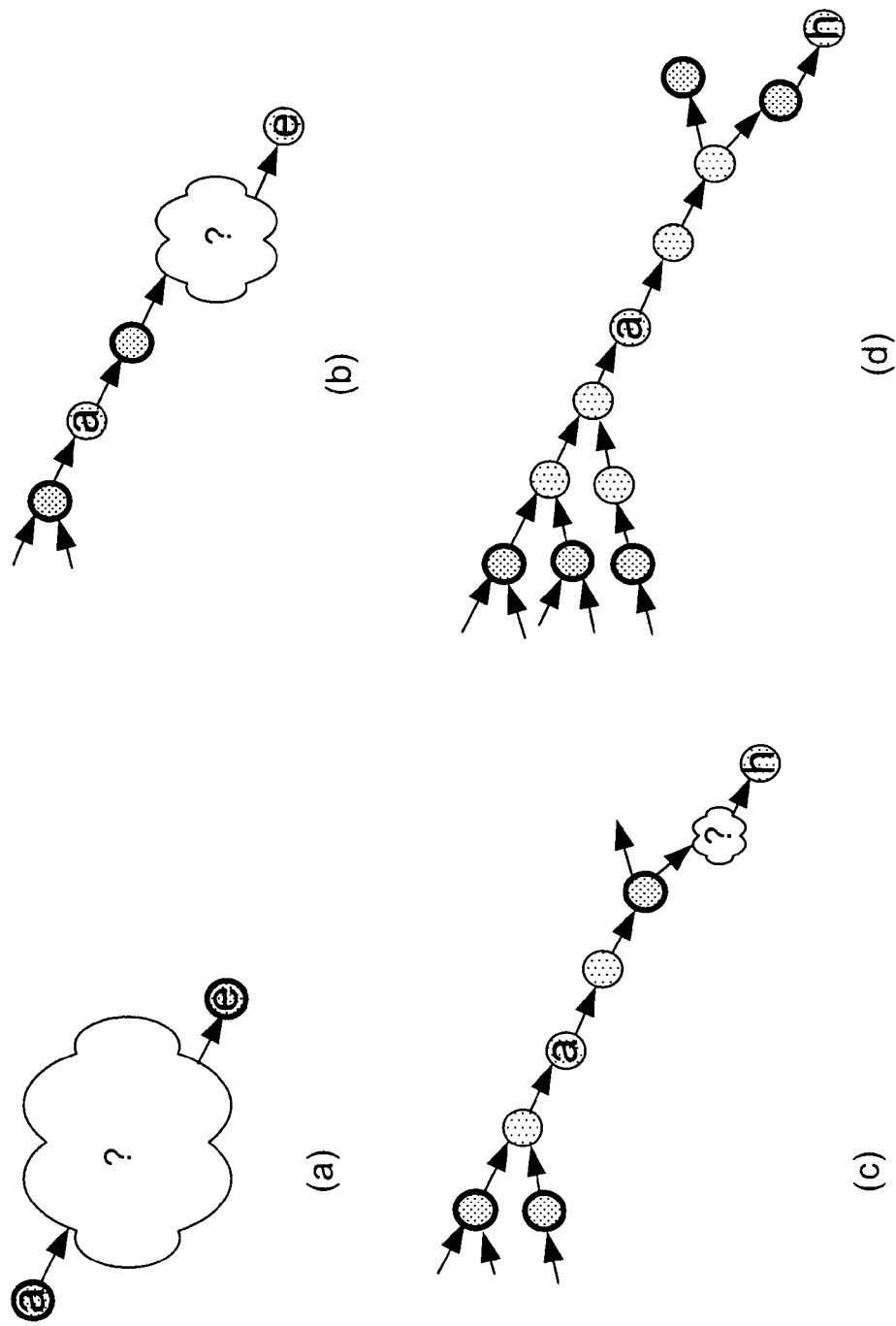
Figure 6:
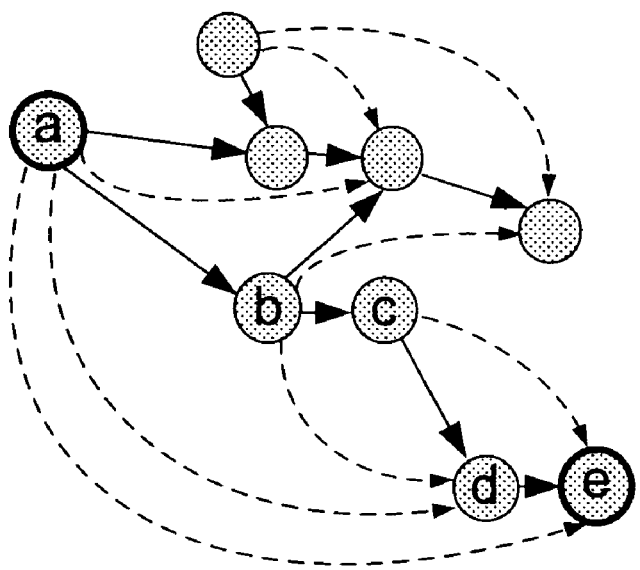
Figure 7:
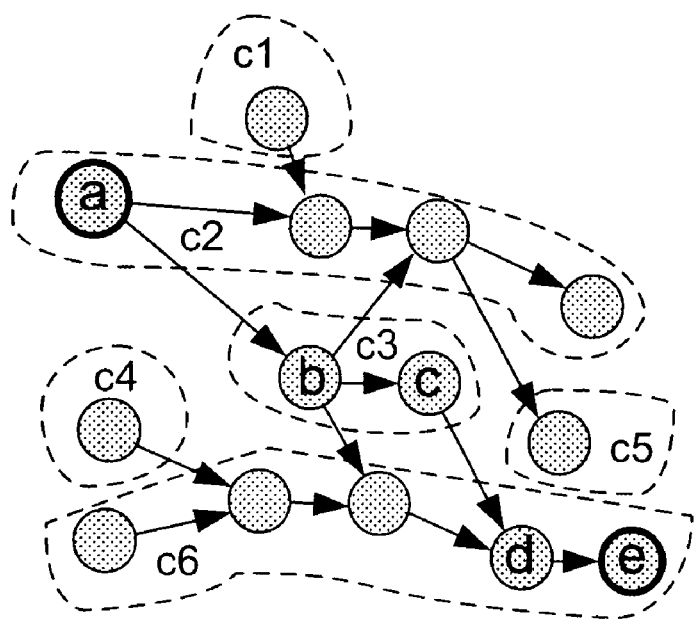
Figure 8:
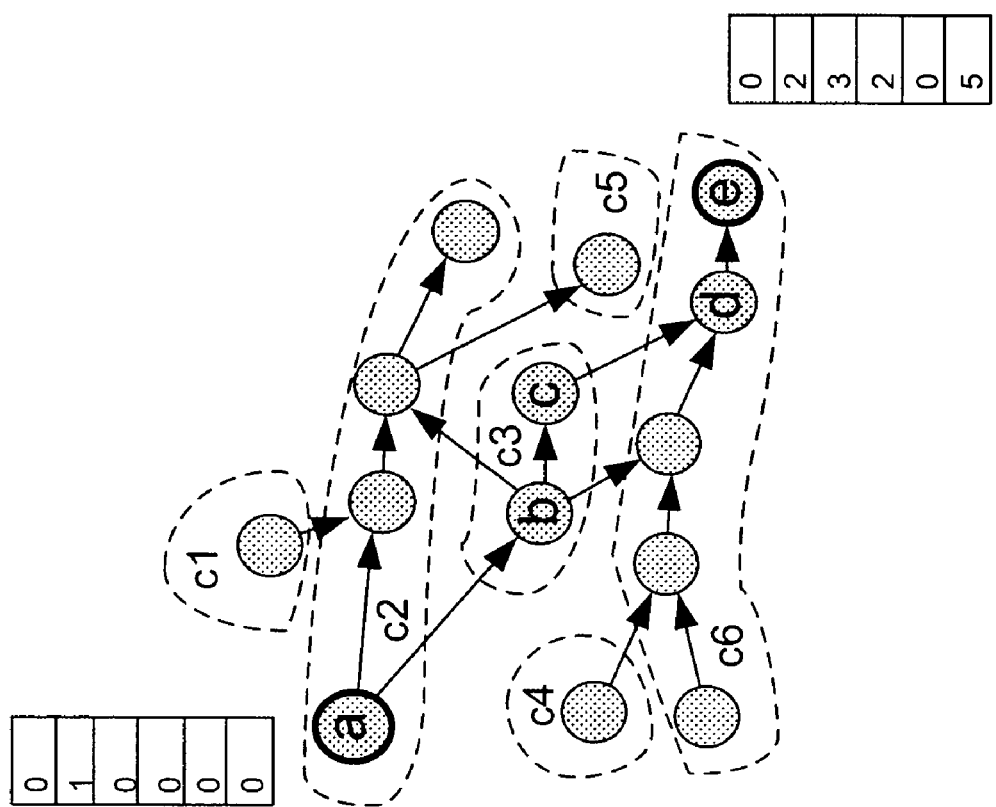
Figure 9:
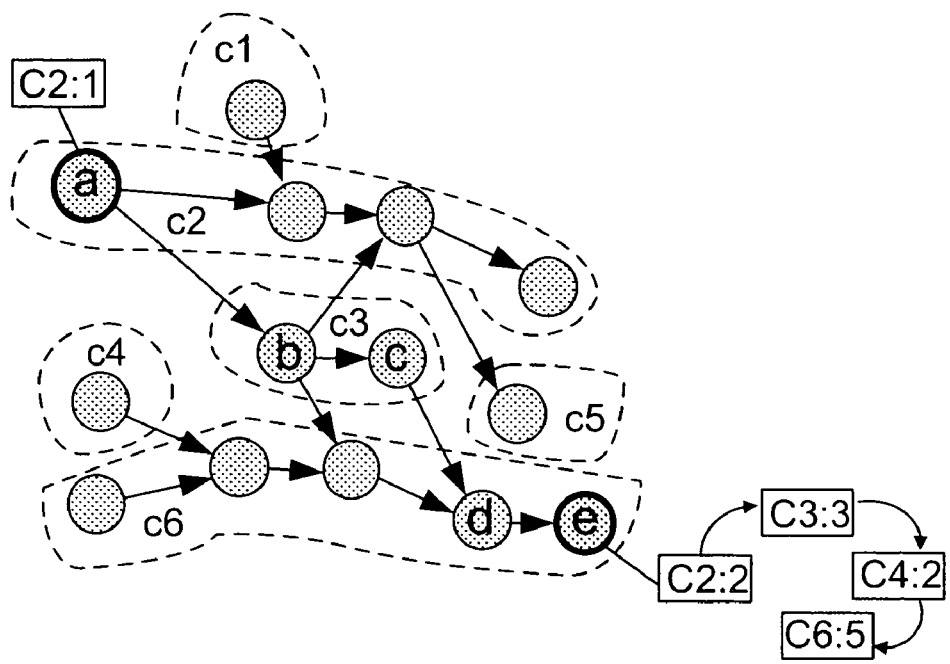
Figure 10:
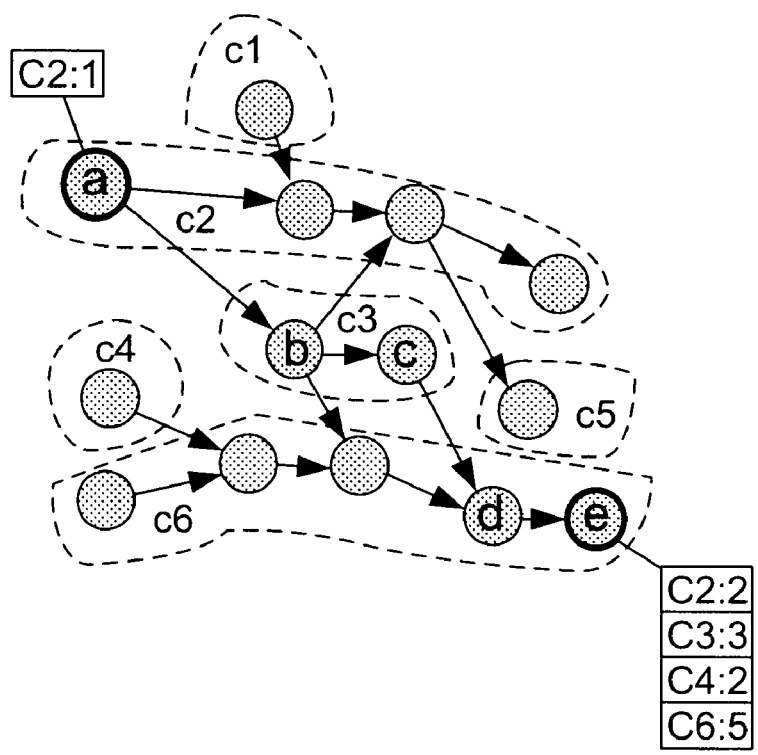
Figure 11:
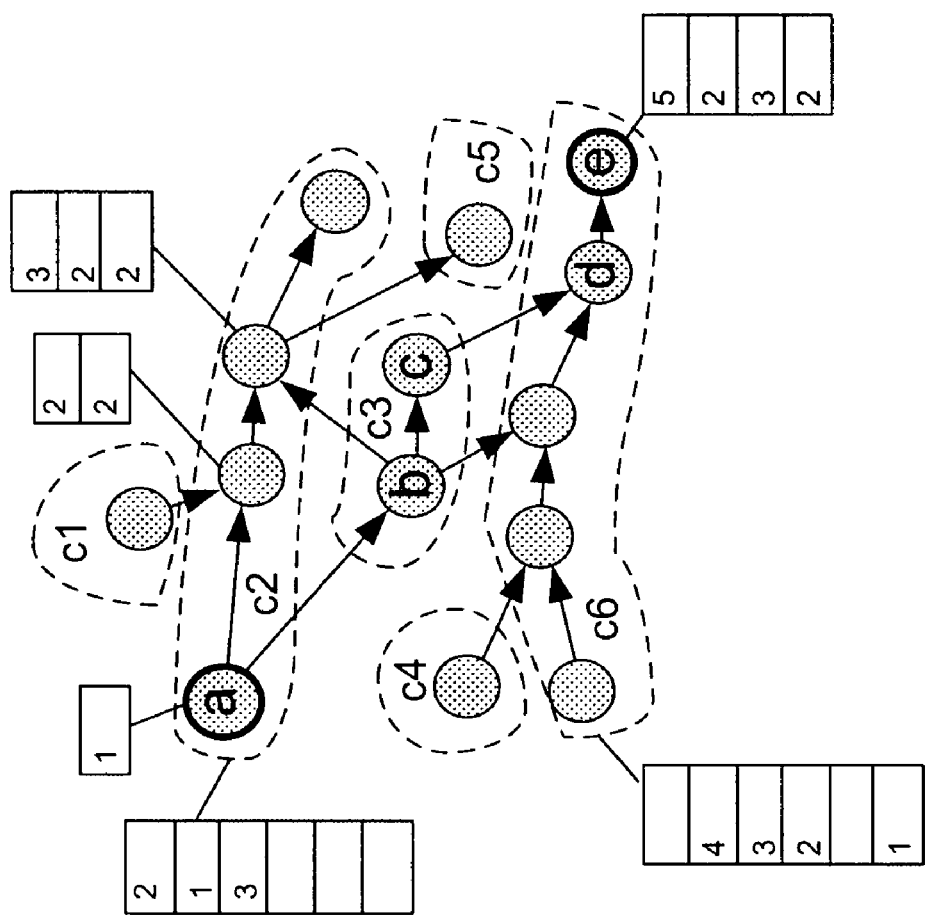
Figure 12:
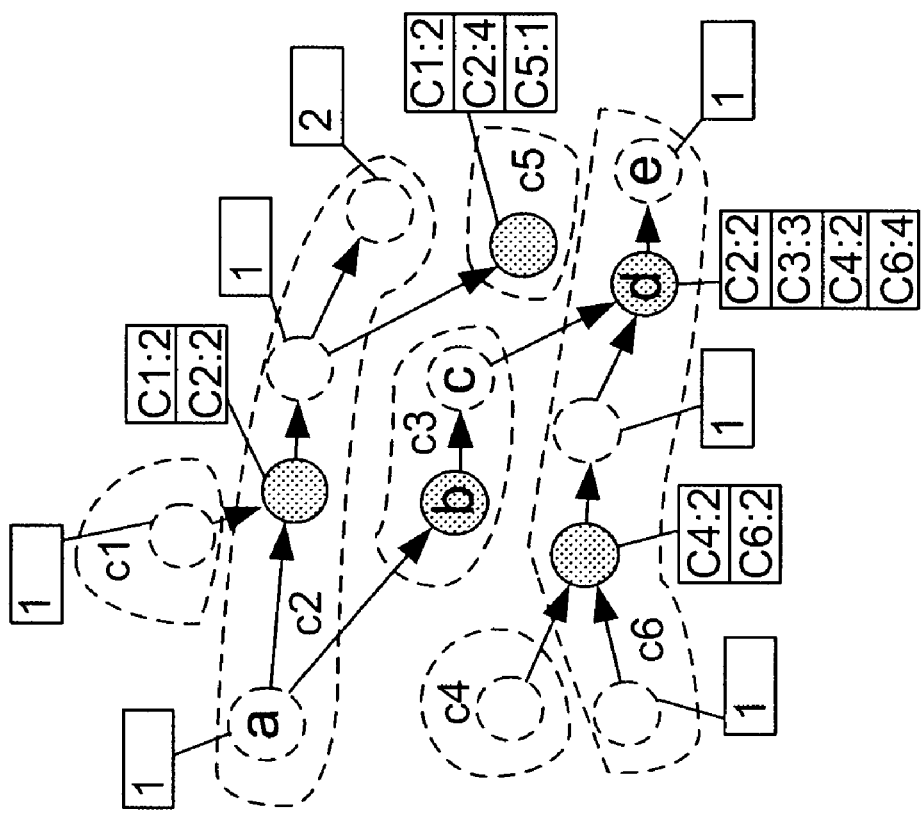
Figure 13:
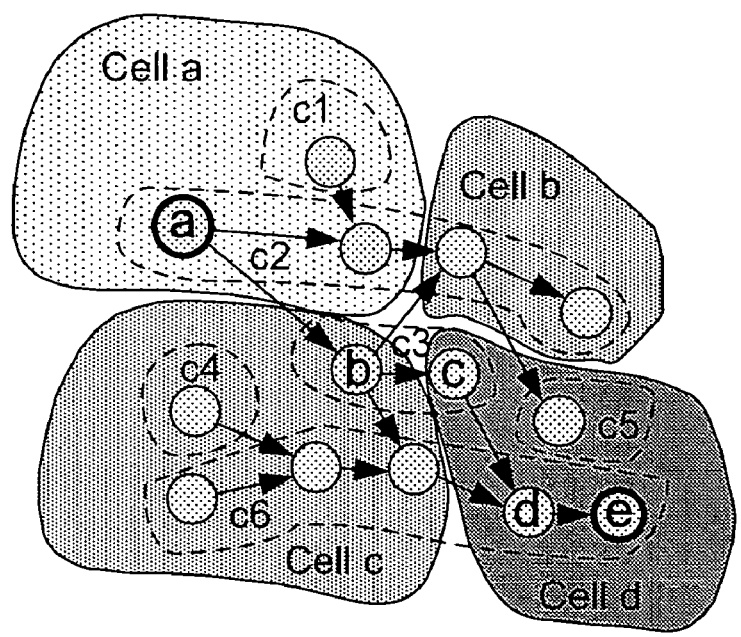
Figure 14:
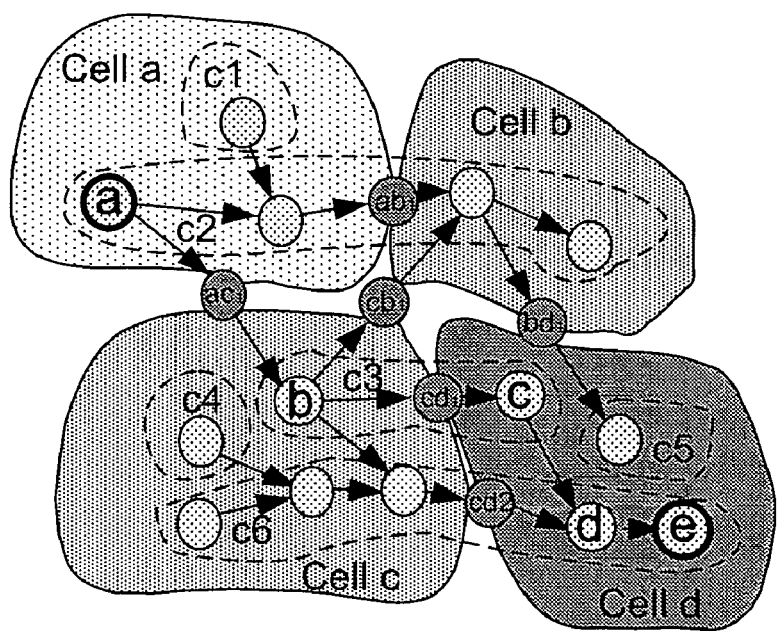
Figure 15:
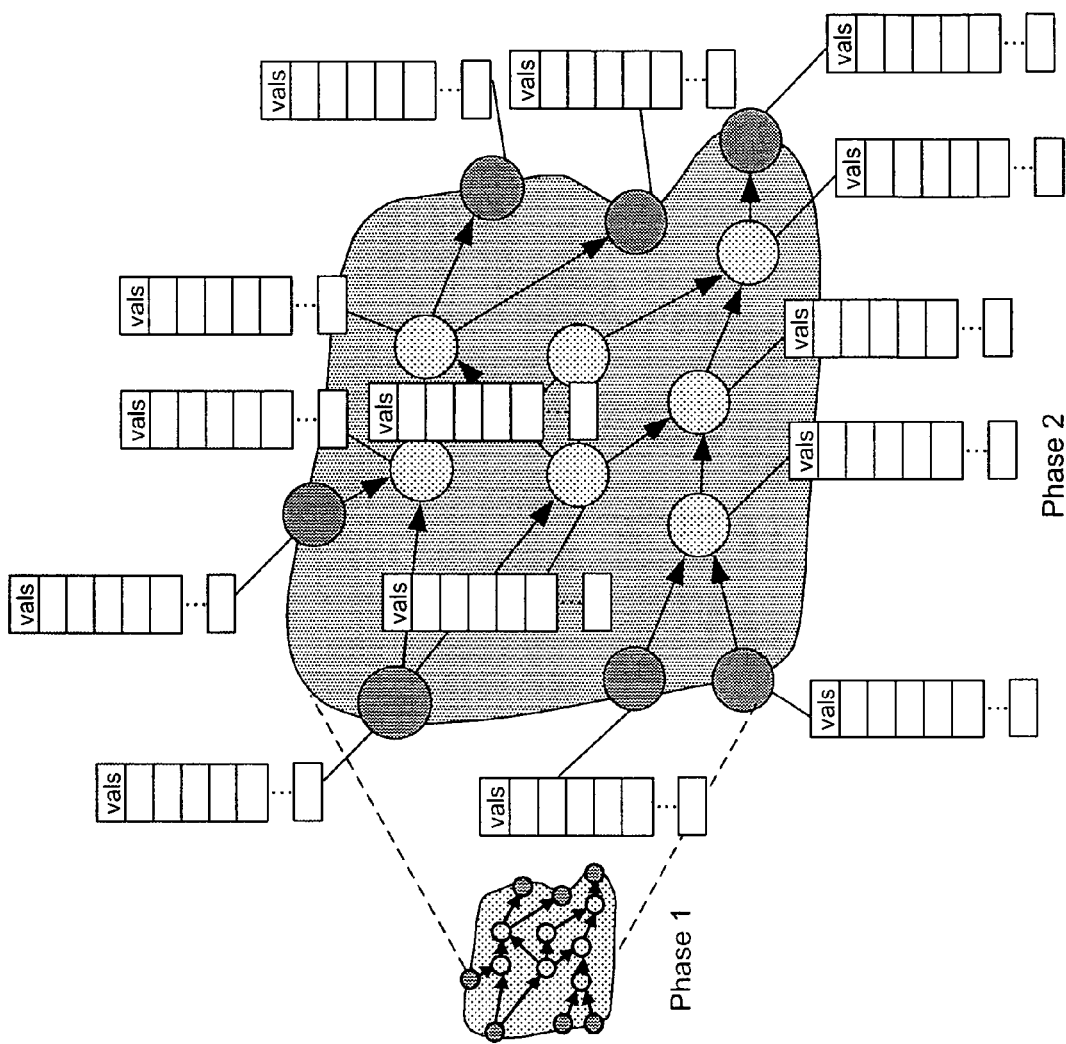
Figure 16:
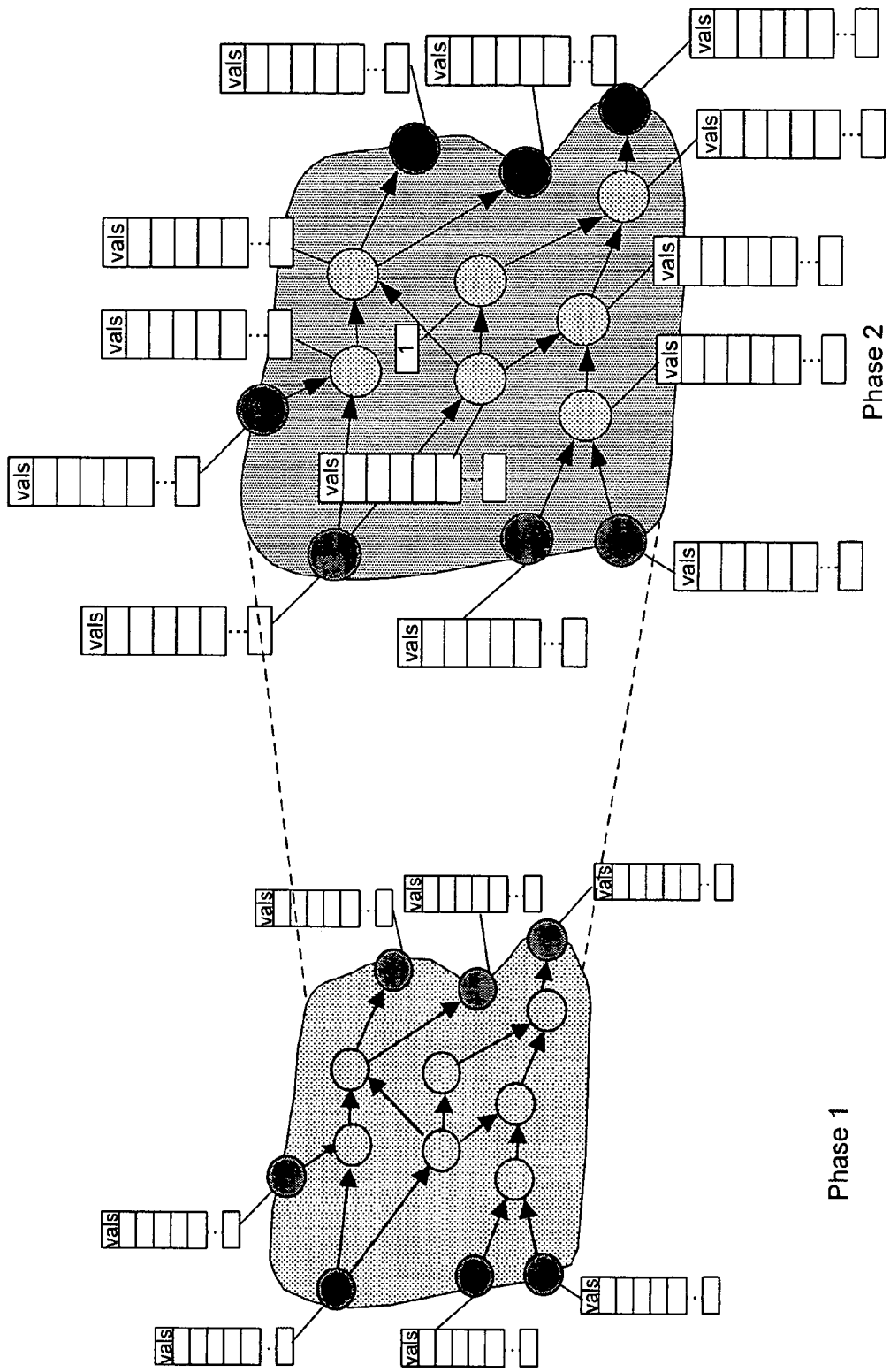

FIGS. 5 A-D illustrate a linear causality search progression to determine event causality relationships, in accordance with various embodiments of the present invention;

FIG. 6 illustrates a graphical representation of causality showing events along transitive edges, in accordance with various embodiments of the present invention;

FIG. 7 illustrates the graphical representation of causality of FIG. 3 partitioned into causal chains, in accordance with various embodiments of the present invention;

FIG. 8 illustrates the partitioned graphical representation of causality of FIG. 7 showing arrays to represent causal tables, in accordance with various embodiments of the present invention;

FIG. 9 illustrates the partitioned graphical representation of causality of FIG. 7 showing linked lists to represent causal tables, in accordance with various embodiments of the present invention;

FIG. 10 illustrates the partitioned graphical representation of causality of FIG. 7 showing a packed representation for causal tables, in accordance with various embodiments of the present invention;

FIG. 11 illustrates the partitioned graphical representation of causality of FIG. 7 showing an event table where each causal chain maintains a master index of all other causal chains, in accordance with various embodiments of the present invention;

FIG. 12 illustrates a partitioned graphical representation of causality showing two event types where both event types include binary counters, in accordance with various embodiments of the present invention;

FIG. 13 illustrates a partitioned graphical representation of causality of FIG. 7 further showing a causal graph partitioned into subspaces or cells, in accordance with various embodiments of the present invention;

FIG. 14 illustrates the partitioned graphical representation of causality of FIG. 13 showing boundary events at subspace or cell boundaries, in accordance with various embodiments of the present invention;

FIG. 15 illustrates multi-phase storage of events within an event subspace, in accordance with various embodiments of the present invention; and FIG. 16 illustrates two phase boundary event subspace causality determination, in accordance with various embodiments of the present invention.

DETAILED DESCRIPTION OF ILLUSTRATIVE EMBODIMENTS

Embodiments of the present invention include, but are not limited to, methods related to determining event causality as derived from a plurality of events, in particular, in a network environment, employing partitioned event spaces, and apparatus or system equipped to practice the method or aspects thereof.

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

In the following description, various embodiments will be described with some details to facilitate understanding. For purposes of explanation, specific numbers, materials and configurations are set forth. However, it will be apparent to one skilled in the art that alternate embodiments may be practiced without the specific details. In other instances, well-known features are omitted or simplified in order not to obscure these embodiments.

Parts of the description will be presented in terms, such as data, events, partitions, subspace boundaries and the like, consistent with the manner commonly employed by those skilled in the art to convey the substance of their work to others skilled in the art. As well understood by those skilled in the art, these quantities take the form of electric, magnetic, RF, or optic signals capable of being maintained, stored, transferred, combined, and otherwise manipulated through electrical and/or optical components of a processor and its subsystems.

The description will be presented in sections. Employment of section labels is to facilitate ease of understanding, and is not to be construed as limiting on the invention. Various operations will be described as multiple discrete steps in turn, in a manner that is most helpful in understanding the present invention; however, the order of description should not be construed as to imply that these operations are necessarily order dependent. In particular, these operations need not be performed in the order of presentation.

Reference in the specification to "one embodiment" or "an embodiment" means that a particular feature, structure, or characteristic described in connection with the embodiment is included in at least one embodiment of the invention. The appearances of the phrase "in one embodiment" or "in an embodiment" in various places in the specification do not necessarily all refer to the same embodiment; however, it may. The terms "comprising", "having", and "including" should be considered synonymous, unless context dictates otherwise. Nor should the use of any of these phrases imply or indicate that the particular feature, structure, or characteristic being described is a necessary component for every embodiment for which such a description is included.

Computing Environment Overview

Figure 1:
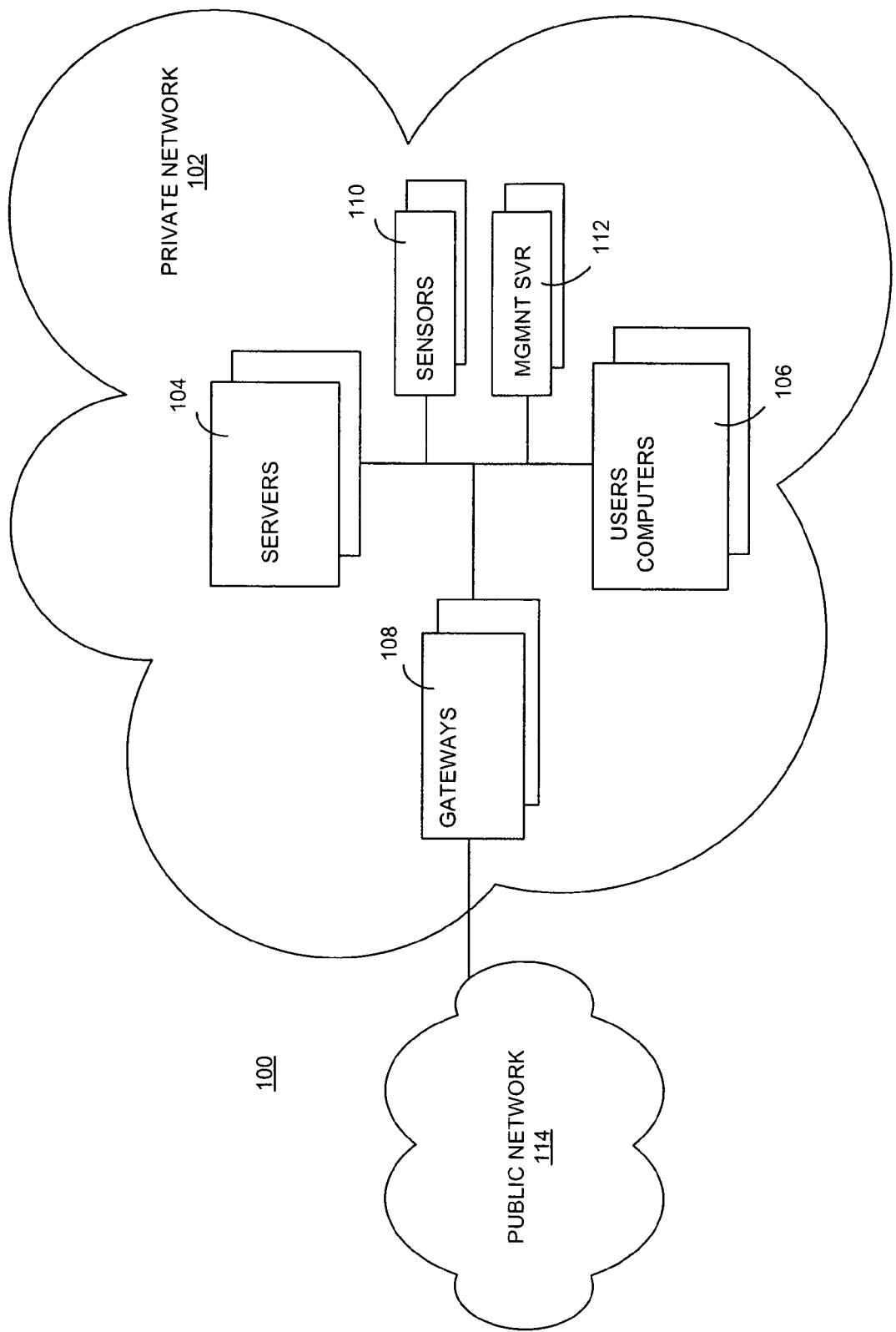
FIG. 1 illustrates a block diagram of a computing environment suitable for use in accordance with various embodiments of the present invention.

Referring now to FIG. 1, wherein a block diagram illustrating a computing environment 100, in accordance with various embodiments, is shown. As alluded to earlier, while the present invention will be primarily described in the context of network management, it is not so limited, and may be practiced in other applications that require understanding of causality between two events and/or phenomenon.

As illustrated, computing environment 100 includes a private network 102 coupled to a public network 114. More specifically, private network 102 includes a number of application servers 104, user computers 106 and gateways 108 coupled to each other and public network 114 as shown. Additionally, private network 102 includes sensors 110 and network management servers 112 coupled to each other and the earlier enumerated elements as shown. In various embodiments, public network 114 may include the Internet.

Sensors 110 are employed to monitor network traffics, detect, and report occurrences of a wide range events, whereas management servers 112 are deployed to manage private network 102 based at least in part on events detected and reported by sensors 110. In particular, at least one of management servers 112 is equipped with a communication interface to receive data associated with occurrence of events of interrelated chains of events and a causality module to maintain a record of its predecessor events with embodiments of the causality logic of the present invention, to determine causality and associate the detected/reported events, and to facilitate management of private network 102. The term "event" as used herein in this context broadly includes virtually all occurrences and happenings that may be sensed, monitored, and/or reported on.

By virtue of the causal relationship analysis capability, embodiments of the present invention are particularly suitable for managing large networks. However, embodiments of the present invention are also suitable for and may be deployed to manage medium to small networks. Thus, depending on the size of private network 102, with respect to the volume of network traffic, and/or the number of events, one or more sensors 110 may be used to detect and to report occurrences of events. Similarly, management server 112 may be employed to manage the network.

In alternate embodiments, some or all of sensors 110 may be combined with management servers 112. Alternatively, a management server 112 could be used to manage multiple networks. In still other embodiments, some or all of application servers 104 may also be combined with management servers 112. Likewise some or all user computers may be combined with the application and/or management servers 104/112.

Except for the causal relationship analysis logic contained in the causality module provided to at least one of management servers 112, the enumerated elements of FIG. 1 otherwise represent a broad range of the corresponding elements known in the art. Thus, the computing environment 100 may include any number of application servers, sensors, management servers, user computers, gateways, and the like. Embodiments of the present invention may use a plurality of network device elements, provided the elements are properly endowed with the resources to handle the resulting number of users and usage the elements are to collectively support.

Network Management Server

Figure 2:
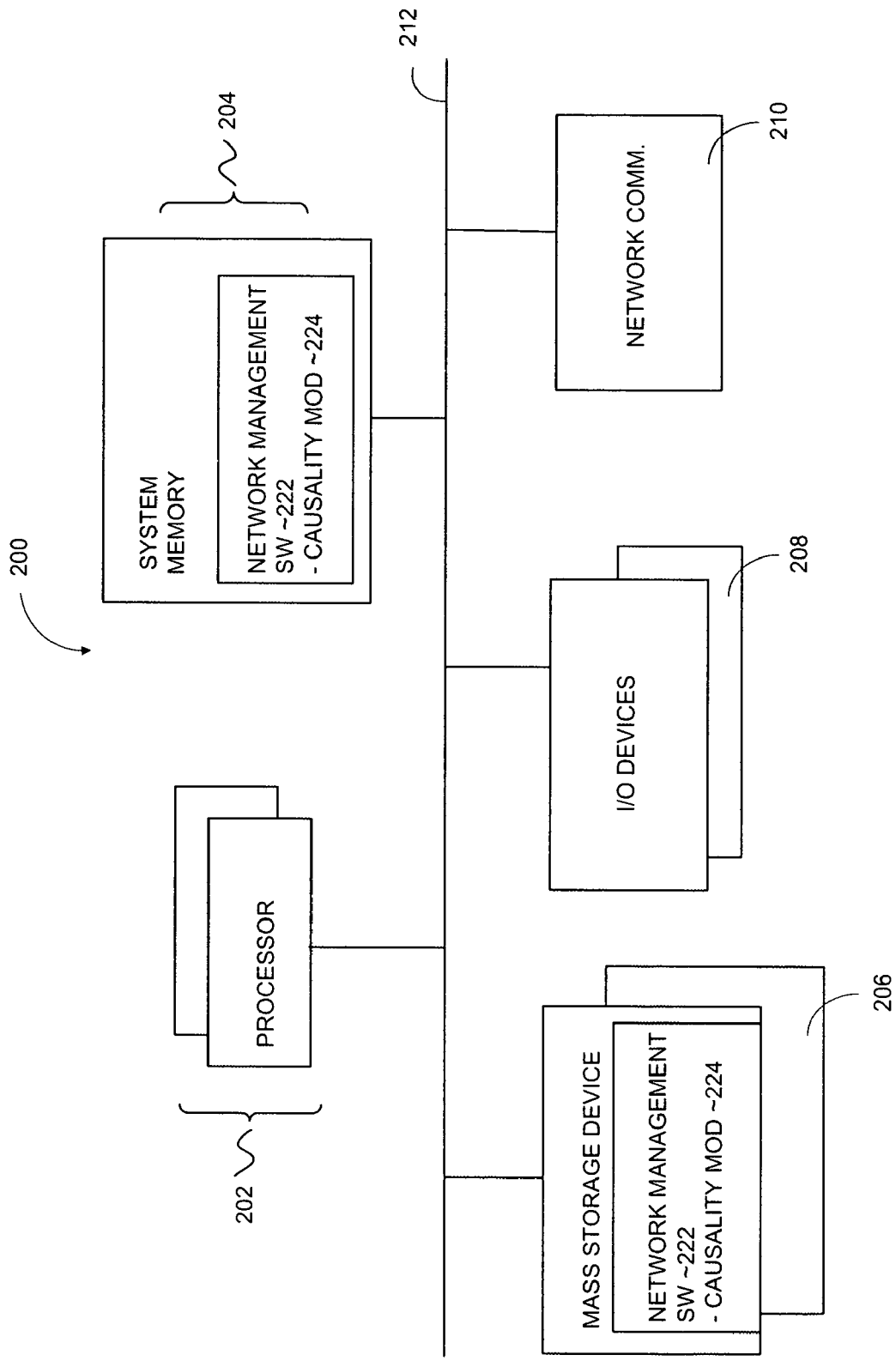
FIG. 2 illustrates a block diagram of an exemplary computing system in accordance with various embodiments of the present invention.

FIG. 2 illustrates a block diagram of computing device 200, which is suitable for use as a network management server 112, in accordance with various embodiments. As illustrated, computing device 200 includes one or more processor 202, system memory 204, mass storage devices 206, input/output devices 208 and communication interfaces 210. Exemplary mass storage devices 206 include diskettes, hard drives, CDROMs, DVDs and the like; exemplary input/output devices 208 include keyboards, cursor controls and the like; and, exemplary communication interfaces 210 include network interface cards, modems and the like. The elements 202-210 are coupled to each other via system bus 212, which may represent one or more buses. In the case of multiple buses, the buses may be bridged by one or more bus bridges (not shown).

System memory 204 and mass storage 206 are employed to maintain and/or to store a working copy and a permanent copy (not shown) of the programming instructions implementing network management software 222 including event causal relationship analysis logic/module(s) 224. The permanent copy of the programming instructions may be loaded into mass storage 206 in the factory, or in the field, through, e.g., a distribution medium (not shown) or through communication interface 210 from a distribution server (not shown).

Except for network management software 222, in particular, causal relationship analysis logic/module(s) 222, the constitution and function of elements 202-212 are known generally, and accordingly they will not be further described.

Network Management

In various embodiments, network management software 222 is adapted to be able to compute and to track the causal relationship of occurrences of events in private network 102 through analysis of network traffic. The causal relationship analysis logic in causality module(s) 224 allows network management software 222 to efficiently perform analysis on all or selected traffic occurring in network 102 even though it may be constrained in computation power and/or storage space. In particular, in various embodiments, network management software 222 is able to establish causal relationships between noticeably odd behavior, and to detect subtleties that would have been hidden otherwise. What constitutes "odd behavior" and/or "subtleties" is application dependent. As will be apparent from the description to follow, the nature of "odd behavior" and/or "subtleties" of a particular application may be reflected through the configuration of the analysis and/or usage of the analysis.

For example, in one embodiment, one or more sensors 110 may be allocated to track connections between computers 106 and/or servers 104e, their connection types, and the quantity of data transferred. Then, assume that the one or more of sensors 110 are able to detect a connection from a first computer 106 to a finance file server 104 transferring a large quantity of data; and, some time later, another connection between the first computer 106 and second computer 106 performs another transfer of a large quantity of data. Finally, a connection is detected between the second computer 106 and an Internet based disgruntled employee website, performing a similarly large data transfer. From these reported detections, management server 112 may infer that one or more employees may have transferred some amount of financial data to a disgruntled employee web site. While management server 112 may not have immediate insight into the actual data transferred, the events justify issuing an alert for a deeper investigation.

Causal Granularity

In various embodiments the immediate causal relationship, which may be of value to subsequent computations, may be selectively determined using different levels of granularity. Thus depending on the information available to a particular network management server 122 has, e.g., with respect to a particular computer and/or communications on the network, the causal relationship may be selectively determined. For example, in one embodiment, if a network management server 122 has no information on how the processes executing on a particular server modify the file system or interact through shared memory, the management server 122 may assume that all events that occur on that server are causally related.

Causal Chain Application

In various embodiments, to simplify and reduce the amount of analysis, a network management server 122 may use causal chains and associate the causal chains with one or more recognizable entities. Exemplary recognizable entities include a work station, a process, a server, and the like. In one embodiment, several entities may be excluded from being considered, because some events they produce may be considered locally causally independent. Some examples of these excluded entities include firewalls, routers, switches, hubs, and the like. In one embodiment a network management server 122 does not automatically consider two events on a firewall to be necessarily causally independent, rather network management server 122 further determines the causality by observing the effects both observed events have on the rest of the network.

Storage Approach

In various embodiments, each network management server 122 used to compute the causal relationship is endowed with a relatively very large but relatively slow hard-drive, and a relatively small but relatively very fast bank of physical memory. The arrangement facilitates a two phase approach to the causal relationship analysis, wherein one phase of the analysis exploits the large size of one type of storage, and the other phase of the analysis exploits the speed of the other type of storage. However, in one embodiment, a network management server 122 may use the memory for first phase storage due to its limited size, and use the hard-drive for second phase storage because of its limited speed.

In various embodiments, the causal relationship analysis may employ the concept of event subspaces or cells, and involve looking up events in a small number of subspaces or cells. Thus, for speed, events of the subspaces or cells may be maintained and/or stored in physical memory. In one embodiment, the causal relationship analysis may involve a lookup event in a large number of infrequently referenced subspaces or cells. Thus, the data will be archived for a long period of time, and events in these subspaces or cells are stored in the storage space of the hard-drive. However, in one embodiment, a caching mechanism is employed, whereby events associated with subspaces or cells which are not frequently needed are flushed out of physical memory, and events associated with subspaces or cells that are required for new computations are imported from the hard-drive. Under this scheme, it is not necessary to conserve as much space in physical memory as on disk, nor is it necessary to require that much performance from the disk. Therefore, the embodiment designates the disk as first phase storage and doubly optimizes events associated with subspaces or cells stored there for space, and designates physical memory as second phase storage and doubly optimize events associated with subspaces or cells stored there for speed.

Introduction To Causal Relationship Analysis

For the purpose of this application, a causal relationship is a relationship between two events, a and b, which states that a meaningfully preceded b. By this, we mean that not only did a happen at an earlier time than b, but rather that a was part of the chain of events that led to b. The causal relationship is transitive and anti-reflexive. In other words, a~>b and b~>c implies that a~>c and that b~/>a. The causal relationship is also the transitive closure of the immediately causal relationship ($\rightarrow$) between two events, a and b, which states that not only did a precede b, but there were no intermediate events between a and b.

In various embodiments, maintenance of the immediate causal relationship is effectuated by: each event having pointers back to immediate causal predecessors. In order to quickly determine whether two events are causally related, a summary of the transitive closure of this relationship is maintained.

In general, this can be both time consuming ($O(n^3)$, where O is the number of operations to be performed and n is the number of events tracked), and space consuming ($O(n^2)$, in addition to the space required for storing events). The alternative to maintaining a transitive summary is to search through the immediate causal relationships to find whether one event transitively leads to another ($O(n)$ per query, with $n^2$ possible queries). Below a series of techniques are described in turn to exploit the commonalities in communication behavior, which may significantly reduce the space required to maintain and/or to store a transitive summary and the time required to compute it.

Turning now to FIGS. 3, 4, and 6-16, particular methods of various embodiments are described in terms of operational mechanisms with reference to a causality graph. The methods and techniques to be performed by a causality module constitute operational programs performed by computing devices or computer-controlled network devices, such as network management server 122. Describing the operational methods of the causality module by reference to a graphical representation enables one skilled in the art to develop such operational programs including such instructions to carry out the methods on suitably configured network devices (causality management server, user computers, servers, gateways, sensors and the like).

The operations may be performed in a computer controlled device or may be embodied in a network device. If written in a programming language conforming to a recognized standard, such instructions can be executed on a variety of hardware platforms and for interfaces to a variety of operating systems. In some embodiments, all or portions of the methods may be implemented via firmware. In yet other embodiments, all or portions of the methods may be implemented in hardware.

It will be appreciated that a variety of devices and methods may be used to implement the causality management system for a network as described herein. Furthermore, it is common in the art to speak of operations, in one form or another (e.g., program, procedure, process, application, etc.), as taking an action or causing a result. Such expressions are merely a shorthand way of saying that execution of the operation by a device causes the causality module of the management system to perform an action or to produce a result.

The Causality Problem

In various embodiments, the causality problem of determining the causal relationship of the events and event associations may be represented by a causality graph representing the immediate causal relationship of all events. The causality problem is to determine whether two events are causally related. In other words, for two events, determine whether there is a path between them in the immediate causality graph.

FIG. 3 shows an example with two events a and e that are causally related through intermediate events b, c, and d. Accordingly, there is a path between events a and e in this graph of immediate causal relationships.

Although this graph is small enough that the relationship is fairly apparent to the observer; in general, the problem looks more like FIG. 2, where there is local information for each event, and a cloud of unknown events on the graph or network between the events. Accordingly, determining whether two arbitrary events a and e are causally related requires clarifying the cloud of events that exist between events a and e.

In various embodiments, one or more of several approaches may be used to solve this causality problem. Exemplary approaches include a linear search, an explicit transitive closure, variations on table-based approaches, and mixed counter methods. A linear search approach investigates a potentially large number of events to determine whether two arbitrarily chosen events are causally related. The explicit transitive closure methods could require a large amount of space to store the relationship information for a relatively small number of nodes. Variations of table methods produce rapid results with significantly less storage than the explicit transitive closure methods. Mixed counter methods produce results that take slightly more time than the various table methods, but also require significantly less space.

Partial Causality

As previously discussed, the mere knowledge of the times at which events occur is insufficient to determine the causal order. For example, events that happened at different times may still be causally independent. However, knowing that one event occurred at an earlier time than another event does reveal that the second event cannot be a causal predecessor of the first event. As a result, it is often possible to compute part of the causality equation very quickly based on simple time stamps, and to acknowledge how those time stamps relate to each other. For example, if all timestamps are assumed to be precisely accurate, given two events a and b such that b has a later time stamp than a, it can be ruled out b~>a as a possibility.

Linear Search Approach

In various embodiments, the linear search approach begins with one of the two events, and searches outward on all immediate causal links, seeking the other event. In the worst case, it may be necessary to investigate all known events to determine that there is no causal link between the two. FIG. 5 demonstrates the linear search approach to determine a~>b. The term "outward" is employed for ease of understanding. The directional characterization is not to be limiting on the present invention.

A partial causality test, where possible, can restrict the direction of search. In our example, we may be able to rule out e~>a, so we need only search events that succeed a and precede e.

Explicit Transitive Closure Approach

In various embodiments, the explicit transitive closure approach adds annotations to the graphical representation of causality to help reduce the time it takes to determine whether there is a path between a particular pair of events. In this case, the annotations are the edges that specifically represent the full causal relationship or the transitive closure of the immediate causal relationship. FIG. 6 shows part of an example graph with the transitive edges as dashed lines. a~>e is represented as a single transitive edge.

Although these annotations can provide an answer to the causal problem in constant time, it takes $O(n^3)$ time to compute the annotations, and $O(n^2)$ space to store them.

The Table Approach

In various embodiments, a causality annotation method that allows us to find a~>b in substantially constant time is employed. This methodology may also require significantly less space than storing one based on the explicit transitive closure method. Some practical issues with respect to data structure and are discussed in greater detail at the end of the section.

For the embodiments, the first operation of a table-based approach is to partition the immediate causal graph into causal chains, where a causal chain is an incomplete sequence of events such that each event in the chain is causally related to all other events in the chain.

FIG. 7 shows the graphical representation of causality from FIG. 3 partitioned into causal chains. This partition is not unique—there may be other, and possibly better ways to partition this causality graph; however, in various embodiments, this is a full partition, which means that none of the causal chains can be merged. To understand this, consider merging chains c2 and c3. Since events b and c are not causally related to many of the events in c2, they are not allowed to be in the same causal chain with those events.

As FIG. 7 shows, many edges are not part of any causal chain. In fact, each chain can be as small as selected—down to a single event. But as explained below, it is beneficial to keep the largest possible causal chains.

The next operation is to annotate the graphical representation of causality with the position of each event relative to the causal chains. For example, event a is the first event in chain c2; event b is the first in chain c3, but it follows the first in chain c2; event c is the second in chain c3, but it follows the first in chain c2; etc. These annotations can take the form of tables, where each chain with a causal predecessor has an entry, and each entry contains the position of the latest predecessor in that chain, plus 1. If an event is the first in its chain, the table entry for its own chain contains the value 1. In the example, the table for a contains c2:1; the table for b contains c2:2 and c3:1; the table for event c contains c2:2 and c3:2; etc. From another perspective, each causal table contains data representative of a predecessor wavefront, where all preceding events for a particular event are either on or behind its wavefront. In this manner, each causal table identifies the events that are on the predecessor wavefront (hereinafter, may also simply referred to as wavefront), and as such, these causal tables may also be known as predecessor wavefront tables (or simply, wavefront tables). For the purpose of this specification, these terms, i.e. "causal tables", "predecessor wavefront tables" and "wavefront tables" may be considered synonymous.

Assuming the causal chain for an event can be determined in substantially constant time (feasible for many causal chain schemas) the complexity of this algorithm with n causal chains and a maximum of p predecessors per event is O(np). There is usually a small upper bound on the number of immediate predecessors each event can have (3) which means that the complexity of computing the predecessor wavefront table is O(n) for each event added.

For the embodiments, the methodology for evaluating the causal relationship between two events a, b, given the predecessor wavefront (PW) tables for both is as follows:
Look up the entries for a's causal chain in both PW tables. If b's value is greater than a's value, then a~>b.
Look up the entries for b's causal chain in both PW tables. If a's value is greater than b's value, than b~>a (properly constructed PW tables will ensure that both conditions do not occur).
If neither of the two conditions are true, then neither a~>b, nor b~>a.
If a PW table does not have an entry for a particular chain, the value for that chain is assumed to be 0.

In the example, event a has the PW table {C2: 1} and e has the PW table {c2: 2, c3: 3, c4: 2, C6: 5}. Comparing a's entry for e's chain (c6) to e's entry for c6 yields 0<5 meaning e~/>a. Comparing e's entry for a's chain (c2) to a's entry for c2 yields 2>1 which means a~>e, exactly as expected.

For these embodiments, this approach only requires four lookups and two comparisons, regardless of the size of the PW tables. Because lookups are expected to be the most common behavior, this is a very desirable property. However, these benefits are typically balanced with other factors, including that the PW tables, in a worst case, have as many elements as there are causal chains.

Another factor alluded to earlier to be considered in implementing this technique is the number of operations O required for the completion of the analysis. Specifically, if the number of chains depends on the number of events, it would require O(n) space for each PW table, or $O(n^2)$ space for the complete set of annotations (the same as the explicit transitive closure). Moreover, if there is no limit on the number of events in a chain, the PW table elements may each require limitless space to store.

Maintaining Tables Efficiently

In various embodiments, the PW tables are implemented with arrays whose size is equal to the total number of causal chains recognized by the system, as illustrated in FIG. 8. Each causal chain is then assigned a number, and that number is the index to the value corresponding to that chain. This may tend to produce a very large representation if there are a large number of causal chains and much of the array may be either unused, or contain redundant information.

Linked Table Technique

Alternatively, in other embodiments, each causal chain may be assigned an index, as illustrated in FIG. 9. As previously discussed; however, instead of allocating a full array for each PW table, the array is allocated as necessary one element at a time. Each element containing useful data also contains a pointer to the next element that contains useful data. Since the index is no longer implicit based on an offset into the array, in various embodiments, the index of each element is stored with the element as well. To find the entry for a particular index, in various embodiments, a linear search of all elements is performed, comparing the index to our desired index, until the desired element is encountered. In a worst case scenario, this technique could require up to three times the memory of the native approach.

Chunk Allocated Tables

In various embodiments, if the maximum size of a PW table is known and the size is considered to be satisfactorily below the total number of causal chains, this may justify use of this sparse method where all of the memory required for each PW table may be allocated at once. In this case, since all elements are packed within a single chunk of memory with no spaces between them, it is not necessary for any element to include a pointer to the next element. Finding a particular element is implemented with a binary search to first read the index of the middle element. Second, if the middle element index is equal to the index sought, that element is returned as a result of the search. Third, if the middle element index is greater than the index sought, perform the first operation on the lower half of the block. Fourth, if the middle element index is less than the index sought, perform the first operation on the upper half of the block.

Hash Tables

In various embodiments, PW I tables may be stored as hash tables. Depending on the quality of the hash function and hash table loading, this can provide effectively the substantial constant time lookup of elements as the case with explicit arrays, and much of the storage efficiency of the linked list or chunk allocated sparse arrays. However, in order to ensure fast lookups, the hash table often needs to be much larger than the amount of data stored.

Chain Indexed Tables

One issue with the block allocated method is that the offset of a particular key may differ from one PW table to another, even within the same causal chain. This is why it is necessary to perform a binary search for each lookup. The reason the position of a key may differ from one PW table to another is because each event may require a PW table with one or more cells than the previous event in the chain, and there is implicit requirement that all elements must occur in array order.

In various embodiments, the chain indexed method is employed to relax this requirement. As shown in FIG. 11, the size of each PW table is sized to the number of entries required, but entries are ordered based on when each of the other causal chains becoming known to the chain containing the PW tables. Thus, for each causal chain, each index appears in the same place in every array that contains that index.

The Mixed Counter Method

In various embodiments, a mixed counter method is employed. For these embodiments, the mixed counter method keeps two or more types of counters instead of uniformly assigning a PW table to each event. This approach works well when there are a large number of events within a causal chain whose immediate causal relations are in the chain as well.

Binary Mixed Counters

In various embodiments, a binary mixed counter method is employed. For these embodiments, it is assumed there are at least two types of events; a type e event has no immediate predecessors outside of its own causal chain; and a type f event has at least one immediate predecessor outside of its own causal chain.

As illustrated in FIG. 12, the events with dashed outlines are of type e, and the solid outline events are of type f Type e events are then assigned scalar counters that maintain a count back to the most recent type f event, and only type f events require full PW tables. Determining causality between two events; however, becomes a little more complicated. Specifically, the causality of events a and b then becomes a determination of whether a and b are type e or f. For type f events, look up the values for a's and b's causal chain in the respective PW table. For type e events, look up the values for a's and b's causal chain in the most recent type f event, and add the scalar counter to the value from its own chain. Compare the resultant values as above. If event a's value for b's causal chain is larger than b's own value, than b~>a. Likewise, if event b's value for a's causal chain is larger than a's own value, than a~>b. Otherwise, there is no relationship.

Again, for properly maintained PW tables, there is no chance that a's value for b's causal chain will be greater than b's value at the same time as b's value for a's causal chain is larger than a's own value. In the worst case, computing causality between two events using binary mixed counters may now require up to eight lookups, two adds, and two comparisons.

Ternary Mixed Counters

In various embodiments, the ternary mixed counter method is employed. For these embodiments, there are three types of events and two types of causal chains. This method works well when there is a clear dichotomy between the numbers of intersections found in causal chains. The types of causal chain are Type 1 and Type 2.

A Type 1 causal chain has direct intersections with a vast number of other causal chains.

A Type 2 causal chain has direct intersections with only a few other causal chains, and most of those are type 1 causal chains.

The definition of these causality chain types is based in part on factors that help reduce the storage space necessary for each application. These factors provide some flexibility in assigning causal chains to one type or the other.

The three types of events are type e, type f and type i. Type e is an event on either type of chain that has no immediate predecessors outside of its own chain. Type f an event on a type 1 chain that has predecessors outside of its own causal chain. Type i an event on a type 2 chain that has predecessors outside of its own causal chain.

With this method, type e events are assigned scalar counters which count back to the most recent type f or type i event. Type f events get full PW tables, but type i events can either have full PW tables, or pointers to a type e or type f event on a type 1 chain.

Divided Event Space

In various embodiments, to further improve efficiency, the event space is partitioned into subspaces so that the simple formulation may be applied to each subspace. The scope of an event space is application dependent. An example is a networked computing environment in support of one or more mission critical applications for an organization/entity. For these embodiments, this configuration allows both the number of causal chains and the number of events per causal chain to be controlled. Provided the partition is causally consistent, completion of causality comparisons between events in the same subspace may stay relatively constant. Causality comparisons made between events from different subspaces requires additional computation time based in part on the number of subspaces and the number of boundary events.

FIG. 13 shows an event space partitioned into four subspaces or cells. A subspaces or cell is effectively a container for a number of events. Connections between events in different subspaces cells are facilitated by adding boundary events. FIG. 14 shows the partitioned causality graph from FIG. 13 with appropriate boundary events. In order to compute the causal relationship between events in two different subspaces, the causal relationship between each event and the boundary event or events for its subspace are first computed, thereafter, the causal relationship between the boundary events on the different subspaces are computed. For example, to determine the causal relationship between event a and event e in a divided space, the system would first determine that a~>$ab_1$, a~>$ac_1$, $cd_1$~>e, and $cd_2$~>e. Next, the system would determine that $ac_1$~>$cd_1$, and $ac_1$~>$cd_2$. Finally, the system constructs applicable paths from one event to another, resulting in the conclusion that a~>e through two paths: a~>$ac_1$~>$cd_1$~>e and a~>$ac_1$~>$cd_2$~>e, therefore a~>e. Of course, e~>a through zero paths, therefore e~/>a.

As described earlier, the divided event space technique works better if the subspace partitions are substantially consistent, i.e., if one arrow points from subspace a to subspace b, then no arrows will point from subspace b to subspace a, and more restrictive, if one can trace a path from subspace a to subspace b by traveling arrows from tail to head, than there is no similar path between subspace b and subspace a. If the subspace partition is not substantially consistent, it becomes necessary to evaluate boundary events when determining the causality between events in the same subspace.

When using PW tables to determine causality within a subspace, the boundary events must each maintain a separate PW table for each subspace they belong to. These boundary events may also maintain a higher order PW table to establish the relationships among boundary events directly.

Hierarchical Divided Event Space

In various embodiments, a hierarchical divided event space method is employed. For these embodiments, subspaces can contain either events or other subspaces. This gives us a way to quickly determine between boundary events. Pushed to an extreme, the approach provides a method for quickly (O(lg n)) solving the causality problem without PW tables. For example, each event comprises a subspace, and these subspaces are grouped into higher subspace, etc. until all events are contained within a single very high order subspace.

Determining the relationships between events relies on first finding a hierarchical level where each event is in a separate subspace, but the subspaces are neighbors. On each side of the split, perform the same algorithm between the query event and the boundary events. The process is repeated until there is an answer.

Multi-phase Storage Approaches

In various embodiments, a multi-phase approach is employed. For these embodiments, the approach requires different amounts of storage depending on storage phases. Storage phases account for different types of storage media and optimize for space, access time, and other factors. Subspaces can move from one phase to another over time. Multi-phase storage can demonstrate a great deal of benefit when applied to heterogeneously to a network of storage subspaces; that is, different cells in the system are in different storage phases.

FIG. 15 illustrates an extreme case of multi-phase storage. In one phase, the subspace is represented without any causal markings; and, in the second phase, the entire subspace is fully marked. In this extreme case, there may be two storage phases. Phase one has no causal optimization tags at all, and phase two has all events fully tagged (with PW tables, or full transitive closure). This extreme approach does not work well in a heterogeneous environment because moving a subspace from phase one to phase two may require moving a number of other subspaces as well. In order to compute the relations for the boundary subspaces, the other side of the boundary needs to be computed.

As shown in FIG. 16, in various embodiments, a mix approach has phase one identify boundary events, and phase two reconstruct the subspace with a binary or ternary count. In this manner, much of the space savings of the extreme case is retained, but the causal tags may be rebuilt based on purely local information and the storage space required for the second phase is also reduced. For example, events not having a boundary event as a predecessor event may include a counter to the next fully tagged event.

Thus, it can be seen from the above descriptions that various novel methods for performing causal relationship analysis and apparatuses equipped to practice various aspects of the method; in particular, for network management, have been described. While the present invention has been described in terms of the earlier described embodiments, those skilled in the art will recognize that the invention is not limited to the embodiments described. The present invention can be practiced with modification and alteration within the spirit and scope of the appended claims of the non-provisional application to follow. Thus, the description is to be regarded as illustrative instead of restrictive on the present invention.

What is claimed is:

1. A method comprising:
   receiving, by one or more computing devices, data associated with a plurality of boundary events of event subspaces of an event space comprising a plurality of events, the boundary events having been added to the event space of events to connect the event subspaces; and
   determining, by the one or more computing devices, whether a first event of a first event subspace has a causality relationship with a second event of a second event subspace by first identifying one or more boundary event of the first and second event subspaces having causality relationship with the first and second events respectively.

2. The method of claim 1, further comprising maintaining, by the one or more computing devices, the data associated with the boundary events, based at least in part on the event subspaces to which the boundary events are members.

3. The method of claim 2, wherein the maintaining further comprises storing the data associated with the boundary events in one or more tables associated with the event subspace.

4. The method of claim 3, wherein the one or more tables are of one or more types selected from the group consisting of linked tables, chunk allocated tables, hash tables, and chain index tables.

5. The method of claim 2, wherein the maintaining further comprises storing the data associated with the boundary events in one or more mixed counters associated with the event subspace.

6. The method of claim 5, wherein the one or more mixed counters are of one or more types selected from the group consisting of binary mixed counters and ternary mixed counters.

7. The method of claim 2, wherein the maintaining further comprises storing the data associated with the boundary events of the event subspaces employing a multi-phase storage having a dormant phase, the dormant phase including storing causal tags for the boundary events of the event subspaces.

8. The method of claim 7, wherein the multi-phase storage further has an active phase that includes constructing causal tags for non-boundary events of the event subspaces.

9. The method of in claim 1, further comprising creating and adding the boundary events of the event subspaces to the event space of events to connect the event subspaces.

10. The method of claim 9, further comprising partitioning the event space to comprise the event subspaces.

11. The method of claim 1, wherein the determining comprises determining the first and second events as having a causality relationship if one boundary event connecting the first and second event subspace is identified as having causality relationship with the first and second events.

12. The method of claim 11, wherein the first and second boundary events are boundary events of a third event subspace, and the determining further comprises determining whether at least a third event of the third event subspace has causal relationships with both the first and second boundary event.

13. The method of claim 11, wherein the determining further comprises determining whether a first and a second different identified boundary events has a causality relationship.

14. A device comprising:
   a processor;
   a communication interface coupled to the processor to receive data associated with occurrences of a plurality of boundary events of event subspaces of an event space comprising a plurality of events, the boundary events having been added to the event space of events to connect the event subspaces; and
   a causality module coupled to the communication interface and operated by the processor, the causality module configured to determine whether a first event of a first event subspace has a causality relationship with a second event of a second event subspace by first identifying one or more boundary events of the first and second event subspaces having causality relationship with the first and second events respectively.

15. The device of claim 14, wherein the causality module is further configured to maintain data associated with the boundary events, based at least in part on the event subspaces to which the boundary events are members.

16. The device of claim 15, wherein the causality module is further configured to maintain the data associated with the boundary events in one or more tables associated with the event subspace.

17. The device of claim 16, wherein the one or more tables are of one or more types selected from the group consisting of linked tables, chunk allocated tables, hash tables, and chain index tables.

18. The device of claim 15, wherein the causality module is further configured to maintain the data associated with the boundary events in one or more mixed counters associated with the event subspace.

19. The device of claim 18, wherein the one or more mixed counters are of one or more types selected from the group consisting of binary mixed counters and ternary mixed counters.

20. The device of claim 14, wherein the causality module is further configured to maintain the data associated with the boundary events of the event subspaces employing a multi-phase storage having a dormant phase, the dormant phase including storing causal tags for the boundary events of the event subspaces.

21. The device of claim 20, wherein the multi-phase storage further has an active phase that includes constructing causal tags for non-boundary events of the event subspaces.

22. The device of claim 14, wherein the causality module is further configured to create and add the boundary events of the event subspaces to the event space of events to connect the event subspaces.

23. The device of claim 14, wherein the causality module is further configured to determine the first and second events as having a causality relationship if one boundary event connecting the first and second event subspace is identified as having causality relationship with the first end second events.

24. The device of claim 14, wherein the causality module is further configured to maintain for event causality determination purposes, less than all the received data associated with occurrences of the plurality of boundary events.

25. The device of claim 14, wherein the causality module is further configured to partition the event space into a hierarchical divided event space.

26. The device of claim 25, wherein the causality module is further configured to determine causality without causal tables.

27. A system comprising:
   at least one sensor configured to monitor for occurrences of a plurality of boundary events of event subspaces of an event space comprising a plurality of events, the boundary events having been added to the event space of events to connect the event subspaces; and
   at least one causality server having a processor, communication interface, and a causality module operated by the processor, the causality server being in communication with the at least one sensor, the communication interface being configured to receive from said at least one sensor data associated with occurrences of the plurality of boundary events, and the causality module being configured to whether a first event of a first event subspace has a causality relationship with a second event of a second event subspace by first identifying one or more boundary events of the first and second event subspaces having causality relationship with the first and second events respectively.

28. The system of claim 27, wherein the causality module is further configured to maintain the data associated with the boundary events of the subspaces employing a multi-phase storage having a dormant phase, the dormant phase including storing causal tags for the boundary events of the subspaces.

29. The system of claim 28, wherein the multi-phase storage further has an active phase that includes constructing causal tags for non-boundary events of the subspaces.

30. The system of claim 27 wherein at least one sensor is assigned to each subspace in the partitioned event space.

* * * * *